United States Patent
Vogt et al.

(10) Patent No.: US 9,567,061 B2
(45) Date of Patent: Feb. 14, 2017

(54) WINDOW FUNNEL AND WINDOW REGION FOR AN AIRCRAFT

(75) Inventors: Jürgen Vogt, Buchholz in der Nordheide (DE); Sebastian Keil, Gruenberg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 98 days.

(21) Appl. No.: 13/553,980

(22) Filed: Jul. 20, 2012

(65) Prior Publication Data

US 2013/0187005 A1   Jul. 25, 2013

Related U.S. Application Data

(60) Provisional application No. 61/509,628, filed on Jul. 20, 2011.

(30) Foreign Application Priority Data

Jul. 20, 2011 (DE) .................. 10 2011 108 167

(51) Int. Cl.
    *B64C 1/14*   (2006.01)

(52) U.S. Cl.
    CPC ........... *B64C 1/1484* (2013.01); *B64C 1/1492* (2013.01)

(58) Field of Classification Search
    CPC ....... B64C 1/1484; B64C 1/1492; B64C 1/066
    USPC .................................. 244/129.3, 129.4, 131
    See application file for complete search history.

(56) References Cited

U.S. PATENT DOCUMENTS

| | | | |
|---|---|---|---|
| 3,191,240 A * | 6/1965 | Slaman et al. ................ | 52/204.5 |
| 6,736,352 B2 * | 5/2004 | Bladt et al. ................ | 244/129.3 |
| 7,560,152 B2 * | 7/2009 | Rajabali et al. ................ | 428/57 |
| 7,578,474 B2 * | 8/2009 | Balsillie et al. ........... | 244/129.3 |
| 7,823,833 B2 * | 11/2010 | Wood ......................... | 244/129.3 |
| 7,988,094 B2 * | 8/2011 | Ostrem et al. ............. | 244/129.3 |
| 8,079,185 B2 * | 12/2011 | Paspirgilis ................. | 52/204.62 |
| 8,105,645 B2 * | 1/2012 | Bruce et al. ................ | 427/126.1 |
| 2008/0042012 A1 * | 2/2008 | Callahan et al. .......... | 244/129.3 |
| 2008/0067288 A1 * | 3/2008 | Eberth et al. .............. | 244/129.3 |
| 2008/0078877 A1 * | 4/2008 | Switzer et al. ............ | 244/129.3 |
| 2008/0308677 A1 | 12/2008 | Kirchoff et al. | |
| 2009/0084900 A1 * | 4/2009 | Krahn ........................ | 244/129.3 |
| 2010/0044513 A1 * | 2/2010 | Gallant et al. ............. | 244/129.3 |
| 2010/0127126 A1 * | 5/2010 | Lieven ....................... | 244/129.3 |
| 2011/0042516 A1 * | 2/2011 | Dolzinski et al. ......... | 244/129.3 |
| 2012/0097794 A1 * | 4/2012 | Fort et al. .................. | 244/129.4 |
| 2012/0241559 A1 * | 9/2012 | Ebner et al. ............... | 244/129.3 |
| 2013/0168495 A1 * | 7/2013 | Mueller et al. ............ | 244/129.3 |

FOREIGN PATENT DOCUMENTS

| | | |
|---|---|---|
| DE | 19806107 A1 | 8/1999 |
| DE | 19806106 C1 | 9/1999 |
| DE | 102004025383 A1 | 12/2005 |
| DE | 102009031523 A1 | 1/2011 |

* cited by examiner

*Primary Examiner* — Brian M O'Hara
*Assistant Examiner* — Jessica Wong
(74) *Attorney, Agent, or Firm* — Carter, DeLuca, Farrell & Schmidt, LLP

(57) ABSTRACT

A window funnel for an aircraft is provided, which has a ring made of an elastic material, which is arranged by means of an adhesive layer on an outer side of the window funnel, the ring having a hollow profile. The ring serves as a sight screen, light screen and dust screen for the rear side of the window funnel.

12 Claims, 10 Drawing Sheets

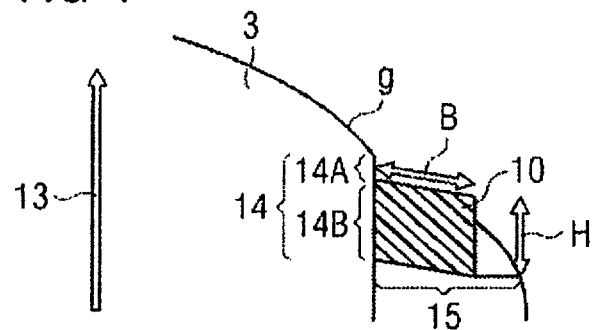
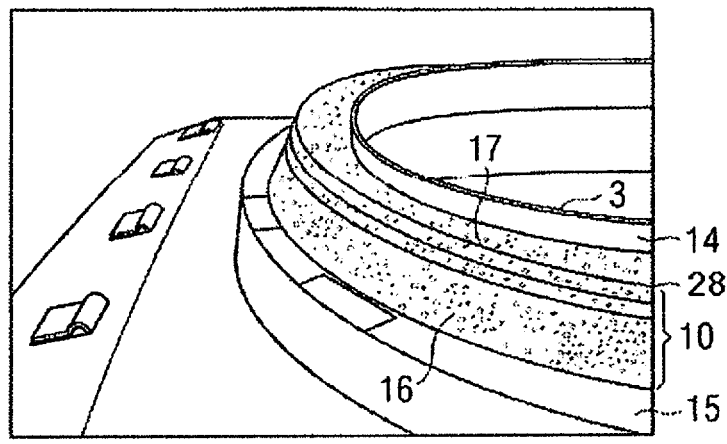
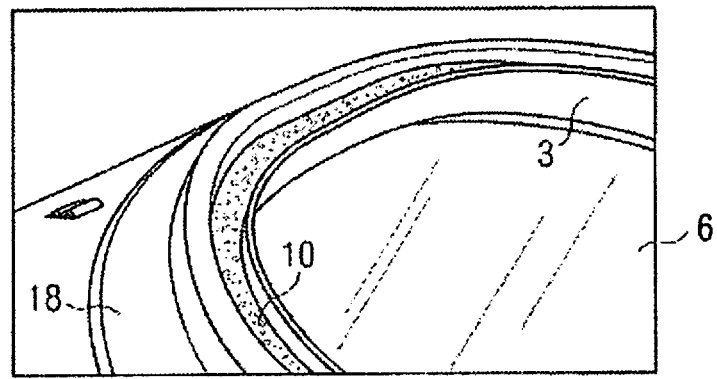

FIG 21
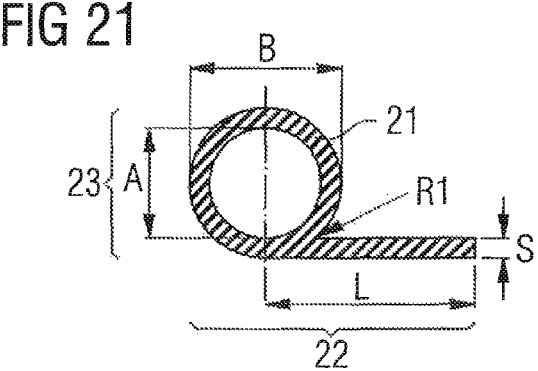
FIG 22
| Dash-no. | A | B | L | S | R1 | R2 | R3 | Mass[1] g/m | Color code |
|---|---|---|---|---|---|---|---|---|---|
| 01 | 6,5 | 9,5 | 16,0 | 1,5 | 0,75 | - | - | 72,0 | |
| ★02 | 13,0 | 16,0 | 20,0 | 1,5 | 2,0 | - | - | 85,0 | |
FIG 23
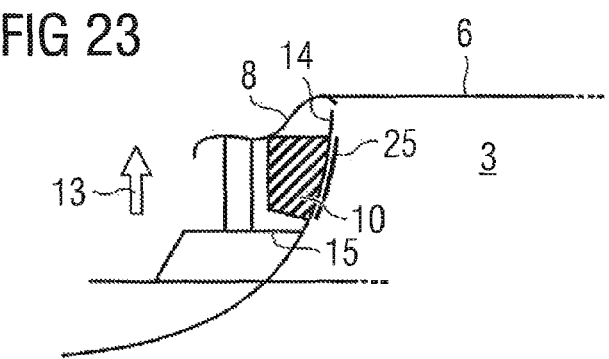
FIG 24
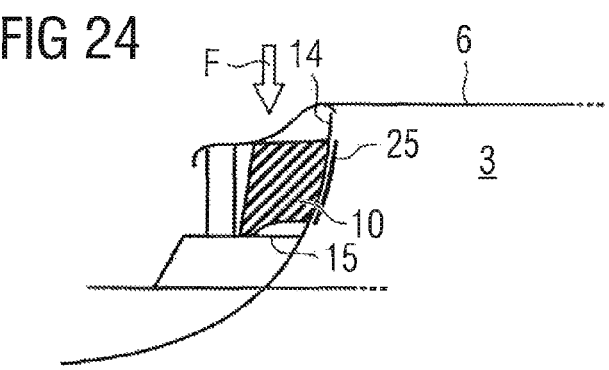

WINDOW FUNNEL AND WINDOW REGION FOR AN AIRCRAFT

CROSS REFERENCE TO RELATED APPLICATIONS

This application claims the benefit of and priority to U.S. Patent Application No. 61/509,628 filed Jul. 20, 2011 and German Patent Application No. 10 2011 108 167.8, each of which are hereby incorporated by reference herein in their entirety.

TECHNICAL FIELD

The invention relates to a window funnel and a window region for an aircraft.

BACKGROUND OF RELATED ART

In modern aircraft, in order to form cabin windows, normally window frames are inserted into corresponding fuselage cutouts and firmly connected to the outer skin of the aircraft. The window frames are covered or lined by means of a so-called window funnel, which is essentially a funnel-shaped deformation of the side panelling. Typically, a plurality of window panes are inserted into the window funnel. The window funnel has an inner side and an outer side (also called a rear side). Normally, a foam ring is fitted on the outer side of the window funnel, in order to prevent the outer side of the window funnel and adjoining elements of the window frame from being visible to a person looking from outside through the cabin window in the direction of the window funnel. Further functions of the foam ring are as a dust screen and light screen.

FIG. 1 shows, by way of example, a window region 1 in an outer wall region 2 of an aircraft.

FIG. 2 shows half of the window region 1 shown in FIG. 1, enlarged. In the outer wall region 2 there is provided a window funnel 3 which penetrates through the outer wall region 2. A window shade 4 and a first window pane 5 are provided on and inside the window funnel 3, respectively. A second window pane (outer glazing 6) is provided above the window funnel 3. A panelling 7 is provided in the outer wall region 2. The second window pane 6 is fixed in the outer wall region 2 by means of a clamping element (a so-called retainer) 8, which is connected to an outer skin of the aircraft.

On an upper part of an outer side 9 of the window funnel 3 there is provided a foam ring 10. The foam ring 10 is fastened by means of an adhesive layer (not shown) and has, in this example, the geometry shown in FIG. 3. The disadvantage of the arrangement shown in FIG. 2 is that the foam ring 10 can become detached from the adhesive layer owing to shearing forces. This may result in gaps between the outer side 9 and the foam ring 10, which is undesirable since the function of the foam ring 10 as a dust and/or light screen is then no longer guaranteed. If the foam ring 10 becomes completely detached from the outer side 9, the outer side 9 and part of the outer wall region 2 opposite the outer side 9 may possibly even be visible to a person looking along the direction indicated by arrow A.

SUMMARY

The object on which the invention is based, therefore, is to specify a window funnel and a window region for an aircraft, with which the above-mentioned problems can be avoided.

To achieve this object, the invention provides window funnels. Furthermore, the invention provides a window region. Advantageous configurations and developments of the inventive concept are also included.

According to a first aspect of the invention, a window funnel for an aircraft is provided, which has a foam ring which is fastened by means of an adhesive layer to an outer side of the window funnel. The foam ring is provided, in an outer region which is not covered by the adhesive layer, with at least one cut and/or with at least one groove.

The at least one cut and/or the at least one groove are advantageously arranged such that, in the event of the foam ring being subjected to an external force, the resulting force on the adhesive layer is reduced or compensated by the at least one cut and/or the at least one groove. The cuts/grooves thus act as buffers which absorb or at least lessen the force acting on the foam ring from outside. Consequently, the force acting on the adhesive layer is reduced, or is even completely eliminated. If the cuts/grooves are produced by means of a milling process or in a similar manner, it is advantageous to seal the surface of the cuts/grooves in order to prevent the foam ring over time from starting to crumble at these places.

According to a second aspect of the invention, a window funnel for an aircraft is provided, which has a foam ring which is fastened by means of an adhesive layer to an outer side of the window funnel. The inner side of the foam ring corresponds in a precise-fitting manner to at least part of the outer side of the window funnel, and the foam ring exhibits no internal stress. In other words: the foam ring is produced such that, when it is fitted on the outer side of the window funnel, no internal stress arises in it (since it has precisely the shape which is required to fit it in a precise-fitting manner on the outer side of the window funnel), so that no forces arise inside the foam ring which could cause a detachment of the foam ring from the outer side of the window funnel A suitable material for the foam ring is, for example, silicone (silicone foam).

According to a third aspect of the invention, a window funnel for an aircraft is provided, which has a foam ring which is fastened by means of an adhesive layer to an outer side of the window funnel. The outer side of the window funnel has a first part running along a funnel direction and a second part connected to the first part and projecting in the form of a collar away from the funnel direction. The foam ring is configured such that it has no contact with the second part without the action of a force, but is deformed such that it bears on the second part with the action of a force. By bearing on the second part, the force which acts is opposed by a counterforce which, in turn, reduces the force acting on the adhesive layer. The advantage of this embodiment is that the foam ring in the "rest state" does not have to lie on the second part, which makes it possible, for example, to use thinner foam rings.

According to a fourth aspect of the invention, a window funnel for an aircraft is provided, which has a foam ring which is fastened by means of an adhesive layer to an outer side of the window funnel. The outer side of the window funnel has a first part running along a funnel direction and a second part connected to the first part and projecting in the form of a collar away from the funnel direction. The foam ring lies on the first part and the second part of the outer side of the window funnel. By virtue of the fact that the foam ring lies both on the first part and the second part of the window funnel, the bearing surface of the foam ring on the outer side of the window funnel is increased and the foam ring thus mechanically stabilised, which reduces the risk of a detachment of the foam ring.

The foam ring may be connected to the outer side of the window funnel in various ways. For example, the foam ring may be connected by means of the adhesive layer only to the first part of the outer side or only to the second part of the outer side. Alternatively, the foam ring may be connected by means of the adhesive layer both to the first part of the outer side and to the second part of the outer side.

The foam ring may cover the entire first part of the outer side. Alternatively, the foam ring may cover only a region of the first part of the outer side facing the second part of the outer side (i.e. the foam ring is arranged merely in the "lower" part of the window funnel). For example, the foam ring may lie on the second, collar-shaped part of the outer side and, starting therefrom, cover a region of the first part of the outer side. How "deep" the foam ring can be situated, depends inter alia on the extent to which the function of the sight screen is still guaranteed.

The foam ring may be a stack of a plurality of foam rings. This is advantageous in particular if the foam ring is to cover the entire first part of the outer side, since the width/height of the foam ring would then have to be great. Thin foam rings are, however, generally easier and more cost-effective to produce. The foam rings of the stack may be adhesively bonded to one another. If thin and thick foam rings are used in a foam ring stack, it is advantageous to arrange the thin foam rings on or near the second, collar-shaped part of the outer side, and to stack the thick foam rings thereabove, since it is in this case more difficult for the thin foam ring to become distorted owing to mechanical or thermal stresses.

The foam ring may have a recess, in which at least part of a retainer adjacent to the window funnel is accommodated. This makes it possible to prevent the foam from being squashed by the retainer during the mounting or owing to vibrations and thus a force being exerted on the adhesive layer which contributes to the detachment of the adhesive layer from the foam ring. The thickness of the foam ring may, starting from the second part of the outer side, increase along the first part of the outer side in the direction of the aircraft outer skin. This makes it possible to prevent the situation where the foam ring is not wide enough at an end facing the aircraft outer skin in order to guarantee an optimal sight screen if the window funnel tapers in the direction of the aircraft outer skin (in this case, the greatest thickness is required at the end facing the aircraft outer skin).

According to a fifth aspect of the invention, a window funnel for an aircraft is provided, which has a ring made of an elastic material, which is arranged by means of an adhesive layer on an outer side of the window funnel, the ring having a hollow profile.

The ring may have a P-shaped hollow profile, the straight part of which is fastened by means of the adhesive layer to the outer side, and the curved part of which projects outwards (away from the outer side).

The elastic material may contain silicone or be composed of silicone or contain foam material or be composed of foam material.

Owing to the good mechanical properties of such a ring, it is often sufficient to fix the ring merely to the first part of the outer side of the window funnel.

According to a sixth aspect of the invention, a window region for an aircraft with a window funnel according to one of the above-described embodiments is provided, with outer glazing being arranged on or above the window funnel. The foam ring is arranged in such a manner on the outer side of the window funnel that it acts as a sight screen and/or light screen and/or dust screen for the outer side of the window funnel and the adjoining elements of the window frame of the window region.

All aspects of the invention may be realised independently of one another or combined with one another in any desired manner.

BRIEF DESCRIPTION OF THE DRAWINGS

The invention is explained in more detail below with reference to the figures in exemplary embodiment, in which:

FIG. 4 shows a schematic illustration of a window funnel with foam ring according to one embodiment;

FIG. 5 shows an illustration of a window funnel with foam ring according to one embodiment;

FIG. 6 shows an illustration of a window funnel with foam ring according to one embodiment;

FIG. 21 shows a schematic illustration of a ring according to one embodiment;

FIG. 22 shows a table with illustrative dimensions of the ring shown in FIG. 21 according to one embodiment;

FIG. 23 shows a schematic cross-sectional illustration of a window funnel with a foam ring according to one embodiment in a first state; and FIG. 24 shows a schematic cross-sectional illustration of the embodiment shown in FIG. 23 in a second state.

DETAILED DESCRIPTION

Figure 1:
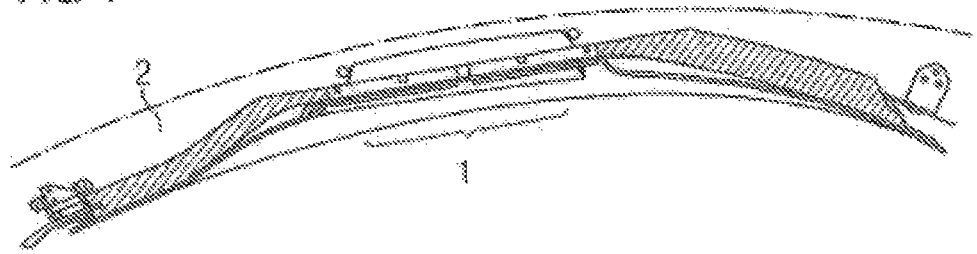
FIG. 1 shows a schematic cross-sectional illustration of an outer wall region of an aircraft fuselage with window region.

Regions, components or component groups corresponding to one another are denoted by the same reference numerals in the figures. Furthermore, it should be mentioned that the drawings are of a schematic nature, i.e. need not be to scale.

FIG. 4 shows an embodiment of a window funnel 3 with a foam ring 10 which is fastened by means of an adhesive layer to an outer side 9 of the window funnel 3. The outer side 9 of the window funnel has a first part 14 running along a funnel direction 13 and a second part 15 connected to the first part 14 and projecting in the form of a collar away from the funnel direction. The foam ring 10 lies on the first part 14 and the second part 15 of the outer side 9 of the window funnel 3. By virtue of the fact that the window funnel 3 lies both on the first part 14 and the second part 15 of the window funnel 3, the bearing surface of the foam ring 10 on the outer side 9 of the window funnel 3 can be increased and the foam ring 10 thus mechanically stabilised, which reduces the risk of detachment of the foam ring 10. The supporting of the foam ring 10 on the second part 15 of the window funnel 3 reduces, for example, the shearing forces on an adhesive layer which connects the foam ring 10 to the first part 14.

The foam ring 10 may be cut from, for example, a foam mat, with the corresponding width. The foam ring 10 then has the height of the foam mat. The foam mat may already be provided with an adhesive layer for attachment to the outer side 9.

Since the window funnel 3 in this embodiment tapers (diminishes) upwards (towards the aircraft outer skin), an outer boundary 30 of the foam ring 10 may, depending on the geometry, be further away at the top from the elements of the outer wall region 2 which surround the window funnel 3 than at the bottom (at or near the second part 15 of the outer side 9). It should therefore be ensured that the choice of the geometry of the installation foam 10 does not cause a gap through which, when looking through the outer glazing 6, the rear side of the side panelling (the rear side of the window funnel 3) can be seen. This problem can be avoided, for example, by the width B of the foam ring 10 being greater in the upper region of the foam ring 10 than in the lower region of the foam ring 10. A gap may also arise due to the fact that an upper region 14A of the first part 14 of the outer side 9 which is not covered by the foam ring 10 is too large, i.e. the foam ring 10 lies "too deep". The height H and the width B of the foam ring 10 should therefore be of sufficiently large design.

FIG. 5 shows an embodiment in which the foam ring 10 is formed as a stack of a first foam ring 16 and a second foam ring 17 which may be adhesively bonded to one another. In this embodiment, the thin foam ring 17 is arranged above the thick foam ring 16. In a further embodiment, the stack order is reversed in order to prevent the thin foam ring 17 from becoming distorted too easily.

FIG. 6 shows the embodiment shown in FIG. 5 with outer glazing 6 and a surround 18.

Figure 7:
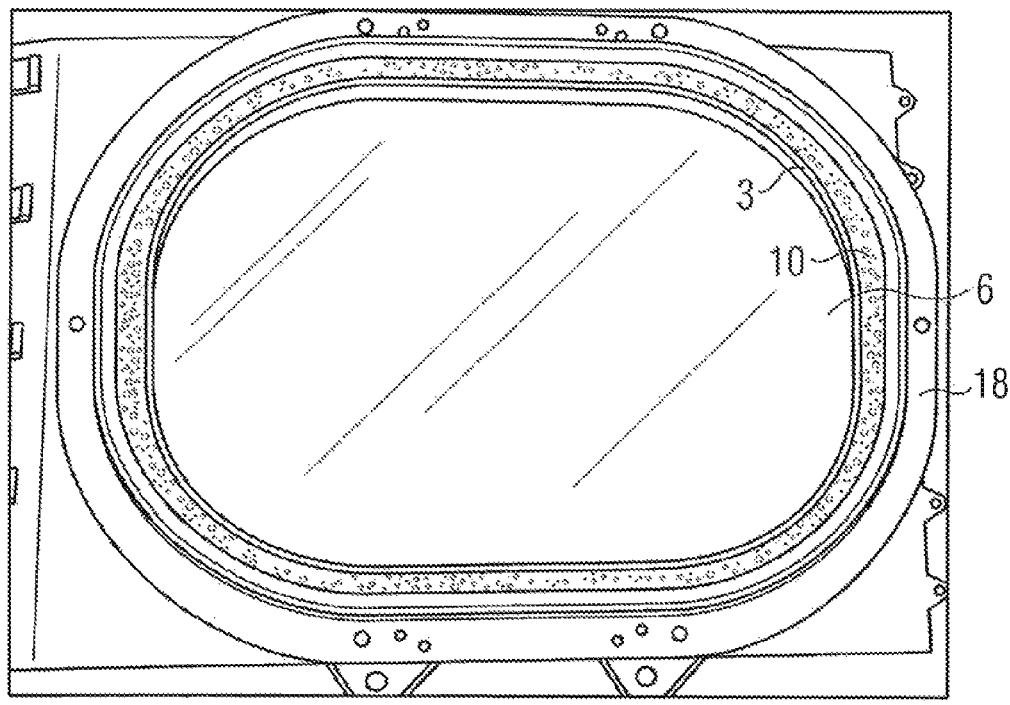
FIG. 7 shows an illustration of a window funnel with foam ring according to one embodiment.
Figure 9:
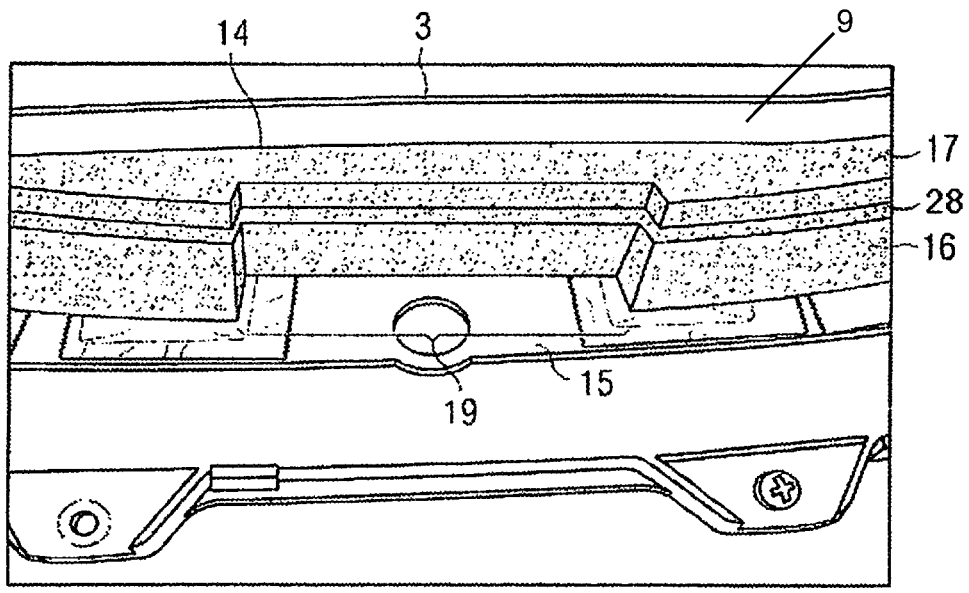
FIG. 9 shows an illustration of a window funnel with foam ring according to one embodiment.

FIG. 7 is a plan view of the embodiment shown in FIG. 9. A cut or groove 28 may be provided in an outer region of the ring 10.

Figure 8:
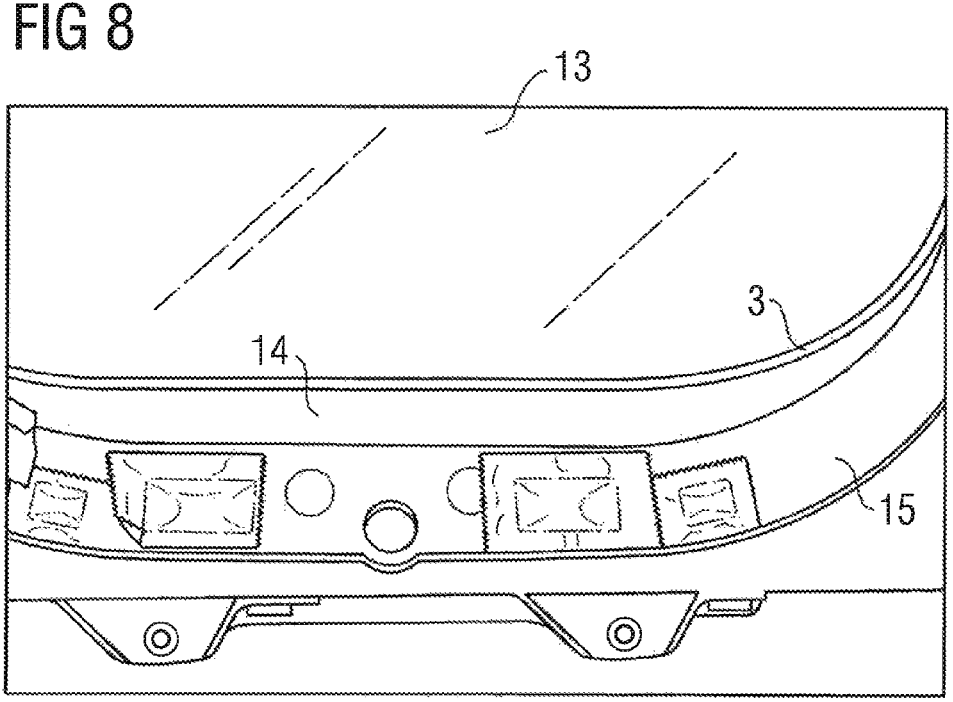
FIG. 8 shows an illustration of a window funnel according to one embodiment.

FIG. 8 shows a plan view of an embodiment of a window funnel 3 without foam ring 10, which has a first part 14, running along a funnel direction 13, and a second part 15, connected to the first part 14 and projecting in the form of a collar away from the funnel direction, of an outer side 9.

FIG. 9 shows the embodiment shown in FIG. 8 after a foam ring 10 has been fitted on the outer side 9 of the window funnel 3. The foam ring 10 lies on the first part 14 and on the second part 15 of the outer side 9. The foam ring 10 has a recess 19, which can receive at least part of a retainer 8 (not shown). The use of the recess makes it possible, in the event of a relative movement between foam ring 10 and retainer 8, to prevent the retainer 8 from pressing on the foam ring 10, which would result in a force transmission to the adhesive layer and thus in a detachment of the foam ring 10. Moreover, pressure marks on the foam ring 10 can be avoided.

Figure 10:
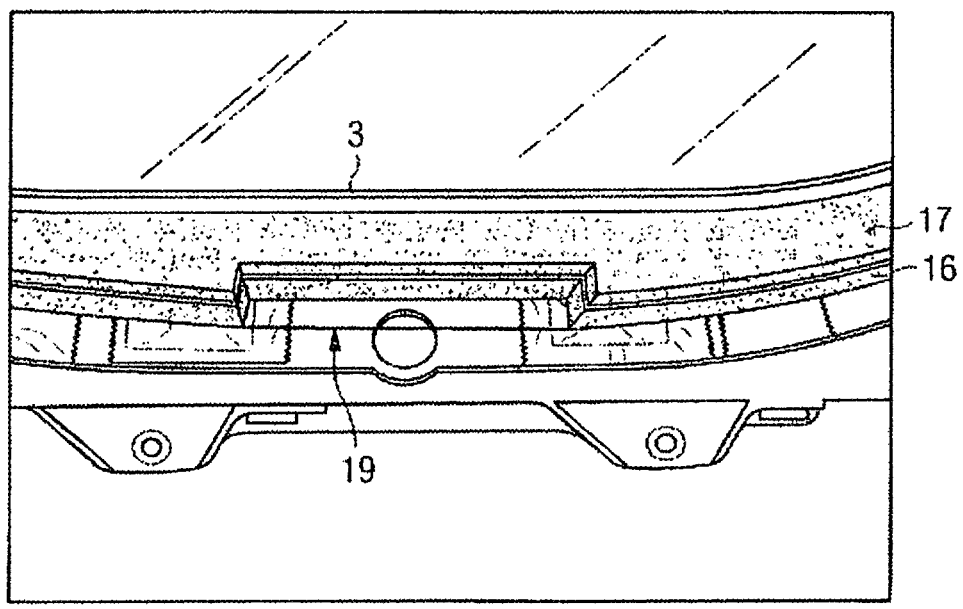
FIG. 10 shows an illustration of a window funnel with foam ring according to one embodiment.

FIG. 10 shows the embodiment shown in FIG. 9 in plan view.

Figure 11:
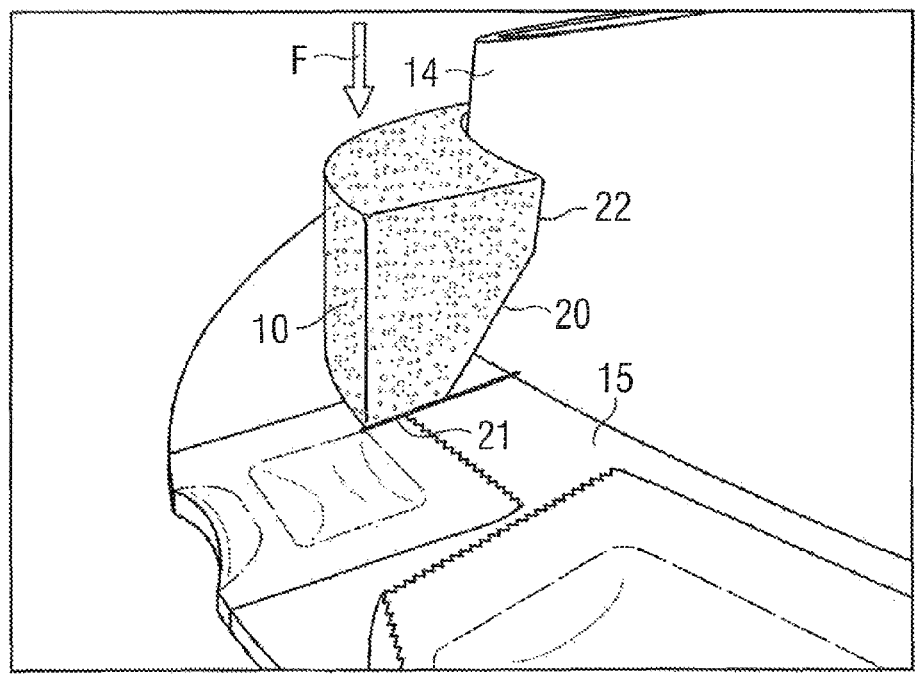
FIG. 11 shows an illustration of a window funnel with foam ring according to one embodiment.

FIG. 11 shows an embodiment in which, compared with the preceding embodiment, the foam ring 10 is made of one piece. In this embodiment, the foam ring 10 has a gap 20 between both the first part 14 and the second part 15 of the outer side 9. The foam ring 10 may be fastened by an adhesive layer 21 to the second part 15 and/or by an adhesive layer 22 to the first part 14 of the outer side 9. By virtue of the fact that the foam ring can be supported on the second part 15, it is possible, in the event of a force acting from the front (denoted by the arrow F) on the foam ring 10, to reduce the force transmission to the adhesive layer 22 (if used), which reduces the risk of detachment of the foam ring 10.

Figure 12:
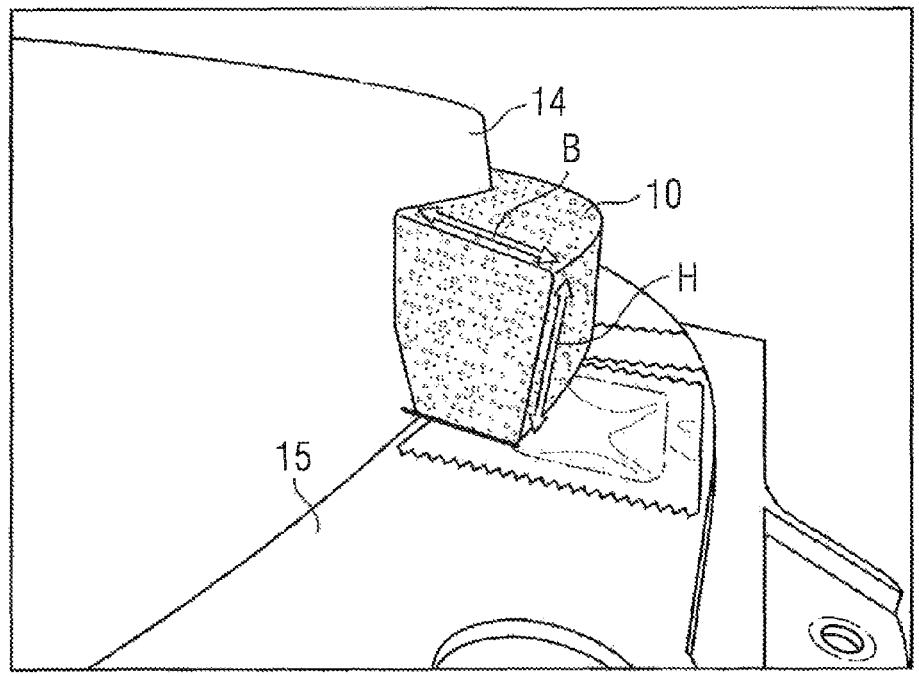
FIG. 12 shows an illustration of a window funnel with foam ring according to one embodiment.

The embodiment shown in FIG. 12 corresponds to the embodiment shown in FIG. 11, with the difference that the gap 20 is avoided by the use of a different foam ring profile. By avoiding the gap 20, the adhesive surface with which the foam ring 10 adheres to the first part 14 can be increased.

In general, the arrow B designates the width of the foam ring 10, and the arrow H the height of the foam ring 10, as indicated in FIG. 12.

Figure 2:
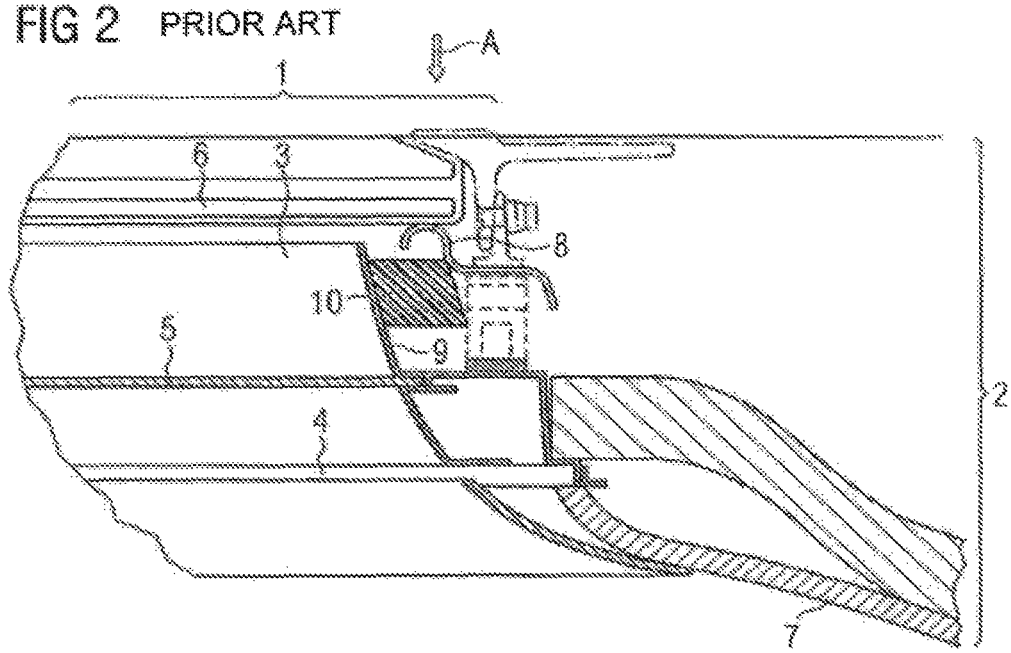
FIG. 2 shows a schematic cross-sectional illustration of a part of the outer wall region shown in FIG. 1.
Figure 3:
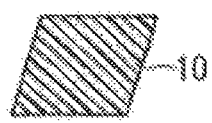
FIG. 3 shows a schematic cross-sectional illustration of a profile of the foam ring shown in FIG. 2.
Figure 13:
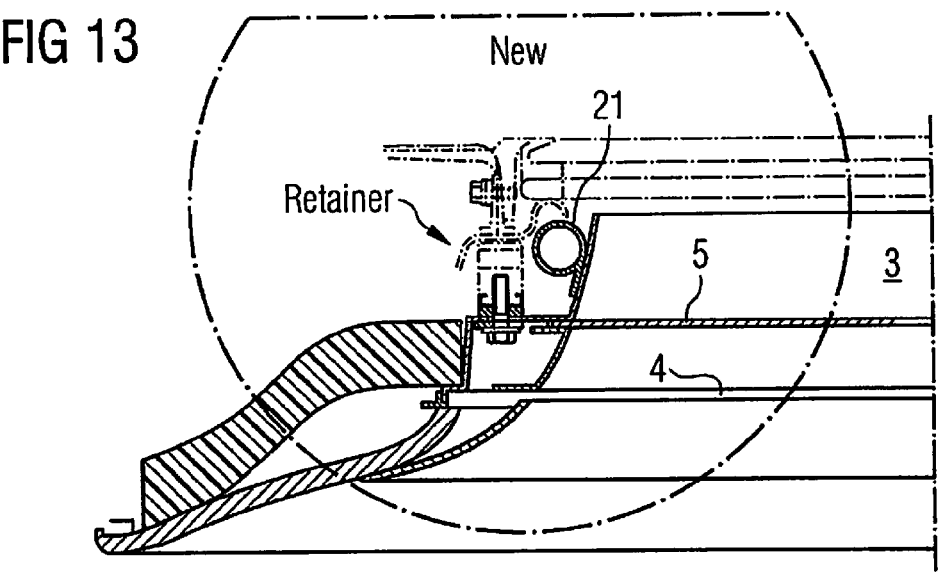
FIG. 13 shows a schematic cross-sectional illustration of a part of the outer wall region shown in FIG. 1 according to one embodiment.
Figure 14:
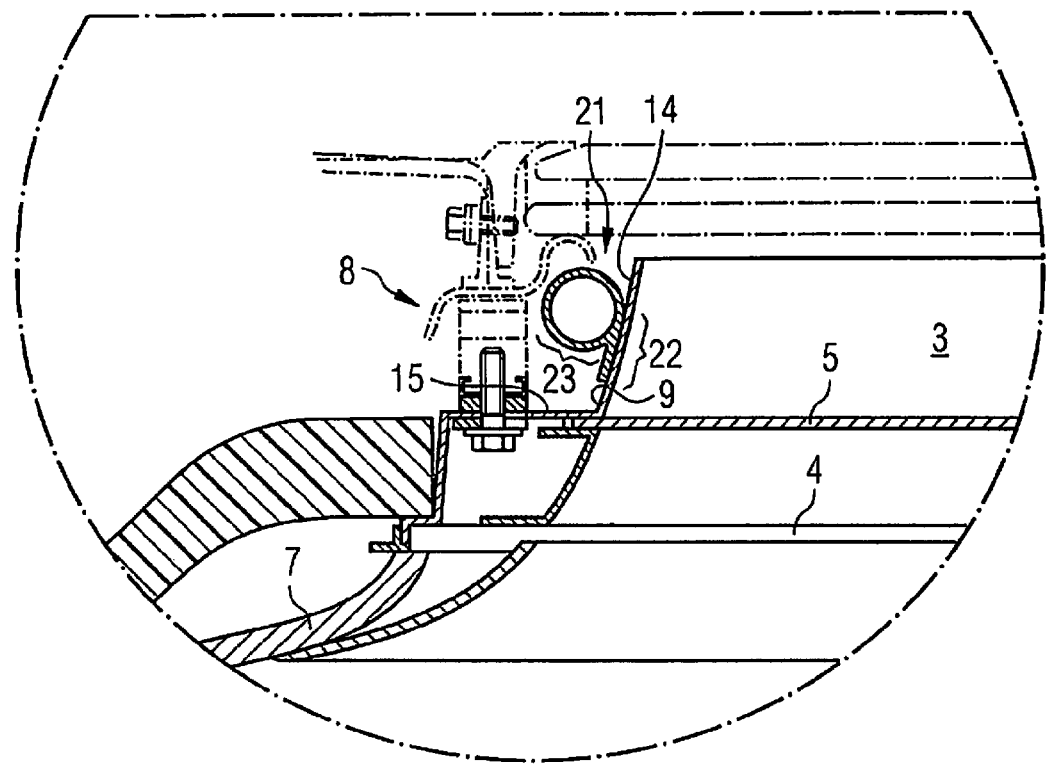
FIG. 14 shows a schematic cross-sectional illustration of a detail of the embodiment shown in FIG. 13.

In FIG. 13 there is shown an embodiment which corresponds to the embodiment shown in FIG. 2, but with the difference that the foam ring 10 is replaced by a ring 21 made of elastic material. The ring 21 has a hollow profile. By using an elastic material with a hollow profile, it is possible to avoid disadvantages of a foam material (e.g. easy detachment and crumbling of the foam material over time).

In this embodiment, the ring has a P-shaped hollow profile, the straight part 22 of which is fastened by means of the adhesive layer to the outer side 9 (the first part 14 of the outer side 9), and the curved part 23 of which projects outwards (away from the outer side 9). The elastic material may contain silicone or be composed of silicone or contain foam material (e.g. silicone foam) or be composed of foam material. Owing to the good mechanical properties of the ring 21, it is sufficient to fix the ring merely to the first part 14 of the outer side 9 of the window funnel 3. The dimensions of the ring 21 may, however, alternatively also be chosen such that the ring 21 lies additionally on the second part 15.

The special shape of the hollow profile enables the ring 21 to absorb or yield to a force exerted by the retainer 8 or the internal stress of the ring 21 itself, with the result that shearing forces on an adhesive layer 25 are reduced. Advantages of the ring 21 are that no pressure marks remain in the ring 21 in the event of a force being exerted on the ring 21, and good fire properties (compared with the foam ring 10, the ring 21 has better fire properties, since the ring 21 is produced from a solid material (e.g. silicone). In general, foams have poorer fire properties than solid materials. Advantageously, the material of the ring 21 or of the foam ring 10 is chosen such that the material does not continue to burn by itself, but is self-extinguishing, as is the case e.g. with silicone).

Figure 15:
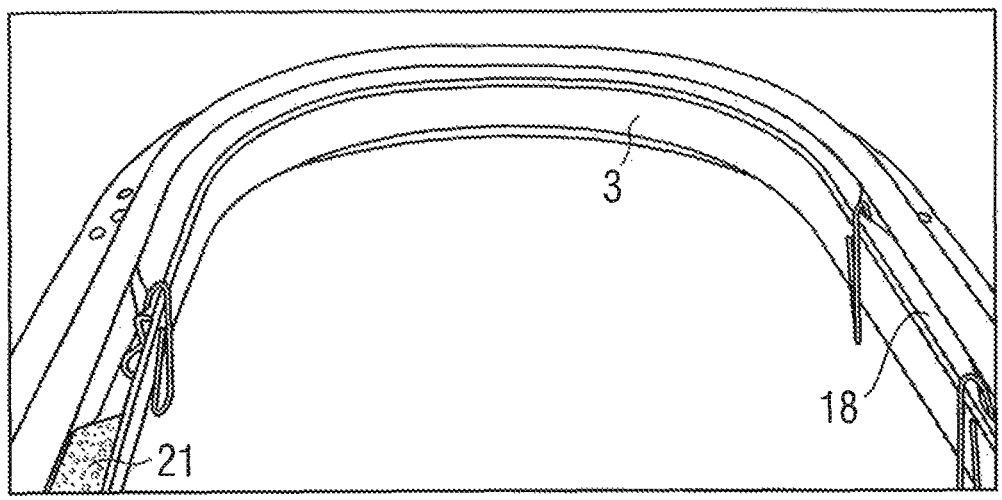
FIG. 15 shows an illustration of a window funnel with a ring according to one embodiment.

FIG. 15 shows an embodiment in which the ring 21 is fitted between the window funnel 3 and a surround 18.

Figure 16:
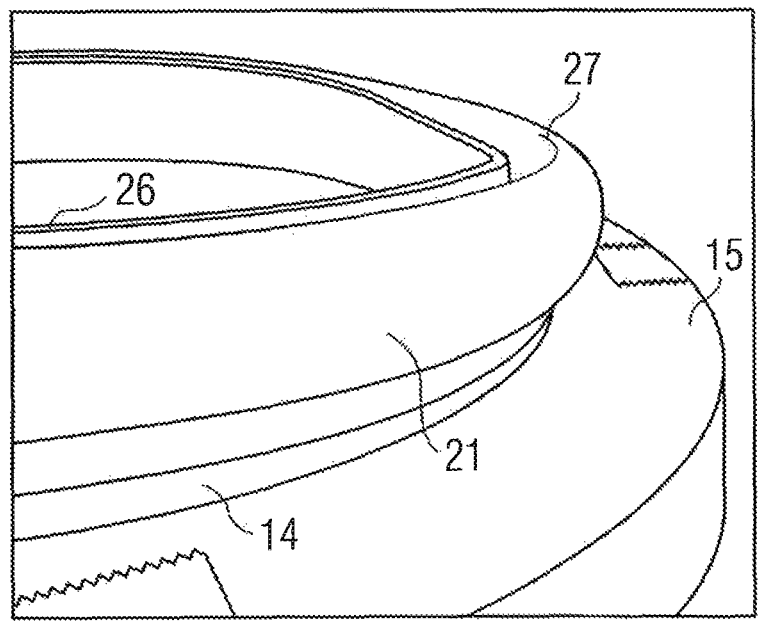
FIG. 16 shows an illustration of a window funnel with a ring according to one embodiment.

FIG. 16 shows the embodiment shown in FIG. 15 before the mounting of the surround 18. As can be gathered from the figure, in this embodiment the ring 21 is fastened by means of an adhesive layer merely to the first part 14 of the outer side 9, and thus the ring 21 does not lie on the second part 15. An upper edge 26 of the window funnel 3 terminates flush with an upper edge 27 of the ring 21.

Figure 17:
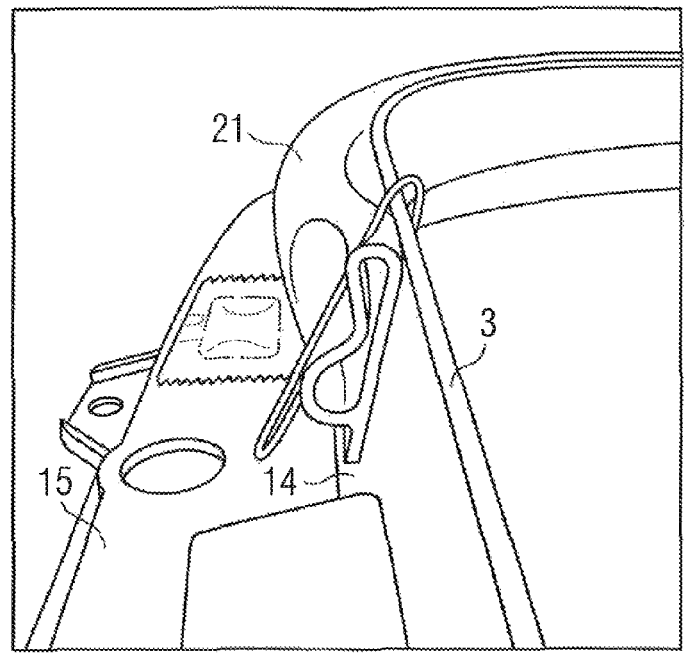
FIG. 17 shows an illustration of a window funnel with a ring according to one embodiment.

In FIG. 17, the embodiment shown in FIG. 16 can be seen from a different point of view, revealing the hollow profile of the ring 21. In a region 24 in which a retainer 8 is to be mounted, the ring 21 can be squashed to create more space for the retainer 8, as indicated in FIG. 17.

Figure 18:
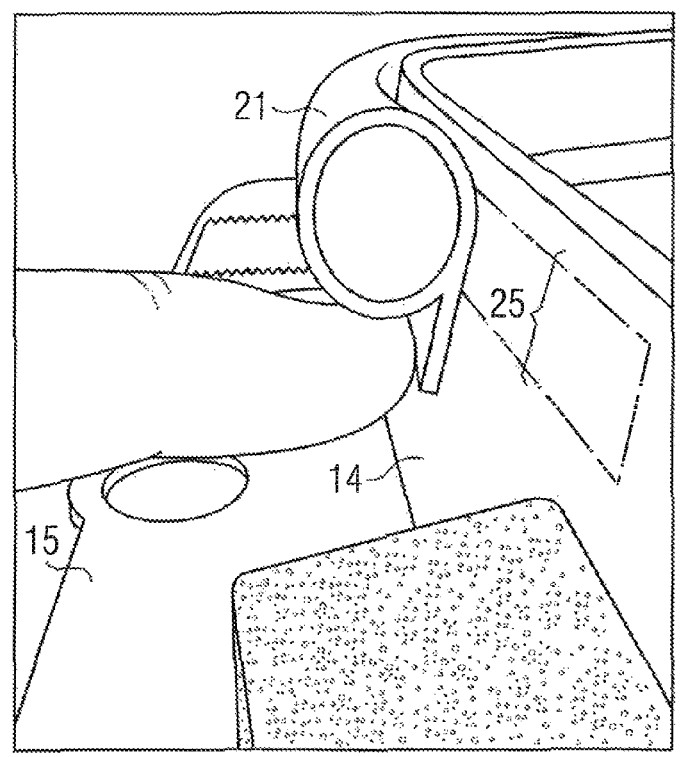
FIG. 18 shows an illustration of a window funnel with a ring according to one embodiment.

In FIG. 18, the hollow profile of the ring 21 is clearly discernible. Furthermore, the adhesive layer 25 by means of which the straight part 22 of the P-shaped profile is fastened to the first part 14 is discernible.

Figure 19:
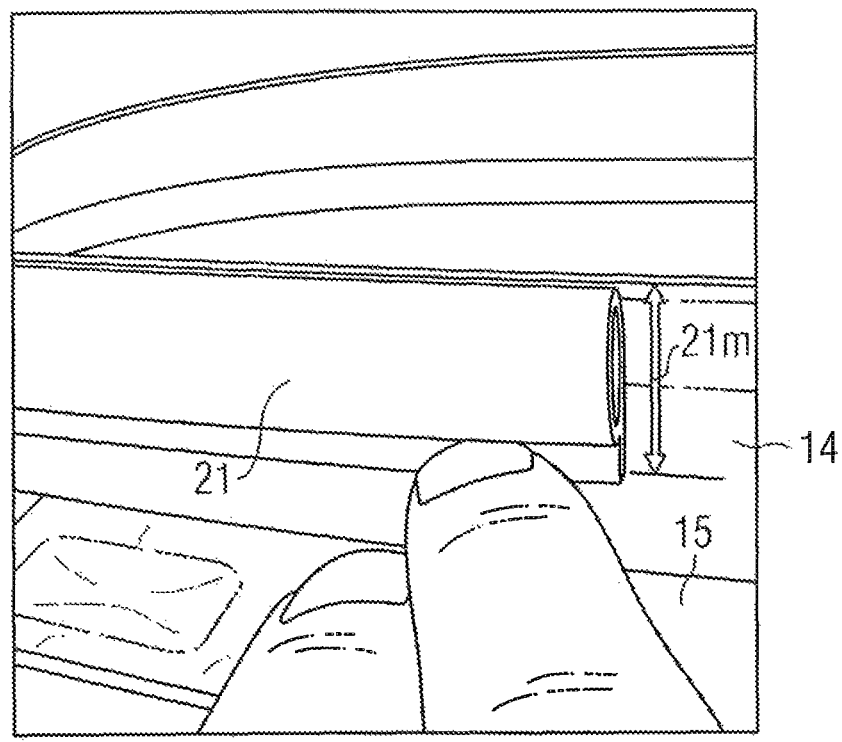
FIG. 19 shows an illustration of a window funnel with a ring according to one embodiment.

FIG. 19 shows the embodiment shown in FIGS. 15 to 18 once again from a different point of view.

Figure 20:
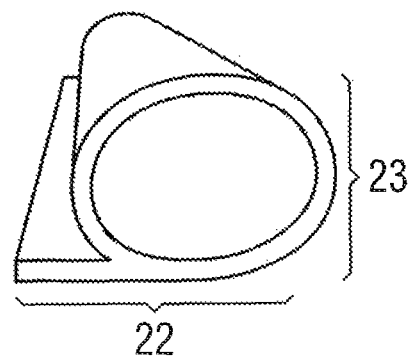
FIG. 20 shows an illustration of a ring according to one embodiment.

FIG. 20 shows the ring 21 once again in cross-section.

FIGS. 21 and 22 show possible dimensions and weights of the ring 21. The dimensions of the ring are, however, to be understood as merely illustrative, since they depend on the particular embodiment of the window funnel 3.

FIG. 23 shows an embodiment of a window funnel 3 with a foam ring which is fastened by means of an adhesive layer to the outer side 9 of the window funnel 3. The outer side 9 of the window funnel 3 has a first part 14 running long a funnel direction 13 and a second part 15 connected to the first part 14 and projecting in the form of a collar away from the funnel direction 13. The adhesive layer 25 is situated between the foam ring 10 and the first part 14 of the outer side 9. The foam ring 10 is configured such that it has no contact with the second part 15 without the action of a force, as shown in FIG. 23. If, however, a force F acts on the foam ring 10 from the front, as shown in FIG. 24, the foam ring 10 is deformed in such a manner that it bears on the second part 15. By bearing on the second part 15, the force F which acts is opposed by a counterforce which, in turn, reduces the force acting on the adhesive layer. The advantage of this embodiment is that the foam ring 10 in the "rest state" does not have to lie on the second part 15, which makes it possible to use thinner foam rings.

In the following description, further aspects of the invention will be explained.

The above-described embodiments have, inter alia, the following advantages: cost-effective production; low weight; ability to absorb or yield to a compressive force by the retainer; the foam rings/the rings may be fastened to the side panelling; the foam rings/the rings can withstand varying loads during the installation of the side panelling, and thus the adjustability of the side panelling is guaranteed; the foam rings/the rings are not detached or altered on variations in temperature (−50° to +80° C.); the foam rings/the rings are not visible from inside; the foam rings may be cut from a foam mat or from a tube; the window funnels do not have to be located centrally in the window frame, and nevertheless a collision at the lower border between foam ring and retainer does not occur; by keeping a distance (of for example 4 mm) between the foam ring/the ring and the border (the upper edge 26 of the window funnel 3), shearing forces which might otherwise occur owing to unevennesses of the upper edge 26 can be avoided.

According to one embodiment of the invention, a foam ring 10 with the following dimensions is used: the width B is 21 mm, and the height H is 17 mm. The standard used is ABS5088C. Compared with conventional foam rings 10 which have a width of 16 mm and a height of 17 mm, this is an increase in the width of about 25%.

According to one embodiment of the invention, a ring 21 made of elastic material according to standard DAN135-A-02-2-11 (P-profile seal) is used, this ring likewise having a width B of 21 mm and a height H of 16 mm.

The dimensions of the foam ring 10 and of the ring 21 depend, of course, on the dimensions of the window funnel 3. Therefore, the numerical examples mentioned above are to be understood as merely illustrative. According to one embodiment, the specified dimensions for the width B and the height H of the preceding embodiments described may also be interchanged, depending on the dimensions of the window funnel 3.

The invention claimed is:

1. A window funnel assembly for an aircraft, comprising:
a window funnel having a funnel shape with an axis extending in a funnel direction; and
a foam ring stack fastened to a radially outer side of the window funnel by an adhesive layer, the foam ring stack including a stack of a first foam ring and a second foam ring arranged on the first foam ring,
wherein the radially outer side of the window funnel has a first part extending axially along the funnel direction and a second part connected to the first part and projecting in a form of a collar radially away from the funnel direction, the collar extending completely around an outer periphery of the first part, wherein the first foam ring lies on the first part and the second part of the radially outer side of the window funnel, and
wherein the second foam ring lies on the first part and the first foam ring.

2. The window funnel assembly according to claim 1, wherein the first foam ring has an outer diameter that is greater than an outer diameter of the second foam ring such that a stepped portion is formed by the first and second foam rings in the radially outer region of the foam ring stack which is not covered by the adhesive layer.

3. The window funnel assembly according to claim 2, wherein the stepped portion is arranged such that, in the event of the foam ring stack being subjected to an external axial force, a resulting force on the adhesive layer is reduced relative to the external axial force exerted on the foam ring stack.

4. The window funnel assembly of claim 1 wherein a radially inner side of the first foam ring corresponds in a precise-fitting manner to the radially outer side of the window funnel such that the foam ring stack exhibits no internal stress.

5. The window funnel assembly according to claim 1, wherein the foam ring stack is connected to the first and second parts of the radially outer side of the window funnel by the adhesive layer.

6. The window funnel assembly according to claim 1, wherein the foam ring stack covers the entire first part of the radially outer side of the window funnel.

7. The window funnel assembly according to claim 1, wherein the first part of the radially outer side of the window funnel includes a region that is covered by the foam ring stack and a region that is not covered by the foam ring stack.

8. The window funnel assembly according to claim 1, wherein the foam ring stack includes a recess, which is shaped to receive at least part of a retainer for the window funnel.

9. The window funnel assembly according to claim 1, wherein an axial thickness of the first foam ring that is adjacent the second part of the funnel is greater than a thickness of the second foam ring.

10. A window region of an aircraft, comprising:
a window funnel assembly according to claim 1;
a side panelling adjoining the window funnel assembly; and
an outer glazing arranged on the window funnel, wherein the foam ring stack is arranged in such a manner on the outer side of the window funnel that the foam ring stack acts as a sight screen for the outer side of the window funnel along a line of sight from an outside of the aircraft through the outer glazing in the funnel direction.

11. The window funnel assembly for an aircraft of claim 1, wherein the second foam ring is thinner than the first foam ring.

12. The window funnel assembly for an aircraft of claim 1, wherein the first foam ring is adhesively bonded to the second foam ring.

* * * * *